(12) United States Patent
Zhou

(10) Patent No.: US 10,132,989 B2
(45) Date of Patent: Nov. 20, 2018

(54) BACKLIGHT MODULE AND DISPLAY DEVICE

(71) Applicants: BOE TECHNOLOGY GROUP CO., LTD., Beijing (CN); BEIJING BOE CHATANI ELECTRONICS CO., LTD., Beijing (CN)

(72) Inventor: Peng Zhou, Beijing (CN)

(73) Assignees: BOE TECHNOLOGY GROUP CO., LTD., Beijing (CN); BEIJING BOE CHATANI ELECTRONICS CO., LTD., Beijing (CN)

( * ) Notice: Subject to any disclaimer, the term of this patent is extended or adjusted under 35 U.S.C. 154(b) by 157 days.

(21) Appl. No.: 14/912,532

(22) PCT Filed: Jul. 24, 2015

(86) PCT No.: PCT/CN2015/084993
§ 371 (c)(1),
(2) Date: Feb. 17, 2016

(87) PCT Pub. No.: WO2016/127588
PCT Pub. Date: Aug. 18, 2016

(65) Prior Publication Data
US 2016/0356950 A1    Dec. 8, 2016

(30) Foreign Application Priority Data

Feb. 15, 2015  (CN) .................... 2015 2 0110603 U

(51) Int. Cl.
*F21V 8/00*   (2006.01)
*G02F 1/1335*  (2006.01)

(52) U.S. Cl.
CPC ......... *G02B 6/0088* (2013.01); *G02B 6/0081* (2013.01); *G02F 1/1335* (2013.01)

(58) Field of Classification Search
CPC .. G02B 6/0086; G02B 6/0088; G02B 6/0081; G02F 1/13355
(Continued)

(56) References Cited

U.S. PATENT DOCUMENTS

| 6,942,374 B2* | 9/2005 | Lee ........................ G02B 6/002 362/561 |
| 7,103,259 B1* | 9/2006 | Kao ..................... G02B 6/0088 385/134 |

(Continued)

FOREIGN PATENT DOCUMENTS

| CN | 1504975 A | 6/2004 |
| CN | 202421531 U | 9/2012 |

(Continued)

OTHER PUBLICATIONS

International Search Report and Written Opinion dated Nov. 25, 2015 regarding PCT/CN2015/084993. Translation provided by Dragon Intellectual Property Law Firm.

*Primary Examiner* — Anabel Ton
(74) *Attorney, Agent, or Firm* — Harness, Dickey & Pierce, P.L.C.

(57) ABSTRACT

The present disclosure provides a backlight module and a display device. The backlight module includes a back plate, a light guide plate (LGP) arranged on the back plate and including a central region and a peripheral region, and an optical sheet arranged on a light-exiting surface of the LGP. The LGP includes a supporting part arranged on the peripheral region and configured to support a display panel.

16 Claims, 5 Drawing Sheets

(58) Field of Classification Search
USPC .................................. 362/97.1–97.4, 632–634
See application file for complete search history.

(56) References Cited

U.S. PATENT DOCUMENTS

| | | | |
|---|---|---|---|
| 8,049,833 B2* | 11/2011 | Park ..................... | G02B 6/0088 |
| | | | 349/58 |
| 9,054,426 B2* | 6/2015 | Soekawa ................ | H01Q 1/243 |
| 2007/0279728 A1* | 12/2007 | Murakata ............. | G02B 6/0088 |
| | | | 359/245 |

FOREIGN PATENT DOCUMENTS

| | | |
|---|---|---|
| CN | 103827738 A | 5/2014 |
| CN | 104375323 A | 2/2015 |
| CN | 204403956 U | 6/2015 |
| JP | 2009140685 A | 6/2009 |

* cited by examiner

BACKLIGHT MODULE AND DISPLAY DEVICE

CROSS REFERENCE OF RELATED APPLICATION

This application is the U.S. national phase of PCT Application No. PCT/CN2015/084993 filed on Jul. 24, 2015, which claims a priority of the Chinese patent application No. 201520110603.7 filed on Feb. 15, 2015, the disclosures of which are incorporated herein by reference in their entirety.

TECHNICAL FIELD

The present disclosure relates to the field of liquid crystal display technology, and in particular to a backlight module and a display device.

BACKGROUND

As illustrated in FIG. 1, usually an existing edge-type backlight module includes components such as a back plate 1, a light source 2 arranged at a side of the back plate 1, a reflector 3 arranged on the back plate 1, a light guide plate (LGP) 4, an optical sheet 5, and a rubber frame 6 arranged around the LGP 3. The rubber frame 6 includes a supporting part for supporting a liquid crystal panel, and a positioning part is arranged on the rubber frame 6 for positioning the optical sheet 5.

For the existing edge-type backlight module, the rubber frame is arranged between a portion of the back plate on which the light source is fixed and a bezel. As a result, it is impossible to provide a thin liquid crystal display device, and meanwhile the production cost will increase.

SUMMARY

An object of the present disclosure is to provide a backlight module and a display device, so as to reduce a thickness of the liquid crystal display device as well as the production cost.

In one aspect, the present disclosure provides in some embodiments a backlight module, including a back plate, a light guide plate (LGP) arranged on the back plate and including a central region and a peripheral region, and an optical sheet arranged on a light-exiting surface of the LGP. The LGP includes a supporting part arranged at the peripheral region and configured to support a display panel.

Further, a position part is arranged at a side of the supporting part facing the central region and configured to position the optical sheet.

Further, the positioning part includes a planar surface perpendicular to the light-exiting surface of the LGP.

Further, the positioning part includes an inclined surface, and an angle between the inclined surface and the light-exiting surface of the LGP is an obtuse angle or an acute angle.

Further, the supporting part is arranged at least at two opposite sides of the LGP.

Further, the supporting part surrounds the LGP to form a frame.

In another aspect, the present disclosure provides in some embodiments a display device including the above-mentioned backlight module.

Further, the display device includes a bezel configured to fix the backlight module to a display pane, and the bezel is fixedly connected to a back plate of the backlight module through a fastening part.

Further, the backlight module includes a light source arranged at a light-entering surface of an LGP, the back plate includes a fastening unit for fixing the light source, and the light source is fixedly connected to the fastening unit of the back plate through a fastening part.

Further, the fastening part is a bolt.

According to the embodiments of the present disclosure, the supporting part is arranged on the LGP to take the place of the rubber frame, so as to reduce the materials used, thereby to reduce the production cost.

DETAILED DESCRIPTION

The present disclosure will be described hereinafter in conjunction with the drawings and embodiments. The following embodiments are for illustrative purposes only, but shall not be used to limit the scope of the present disclosure.

Figure 1:
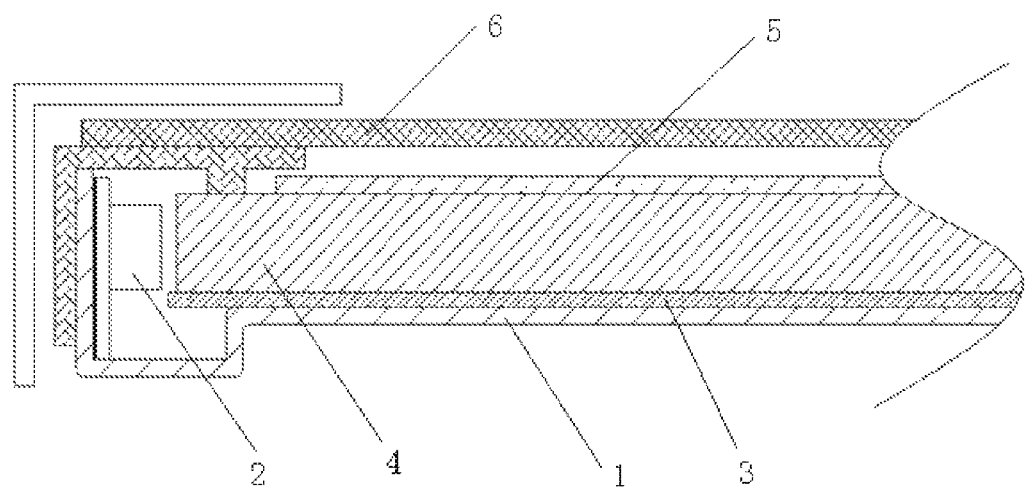
FIG. 1 is a schematic view showing an existing display device.
Figure 2:
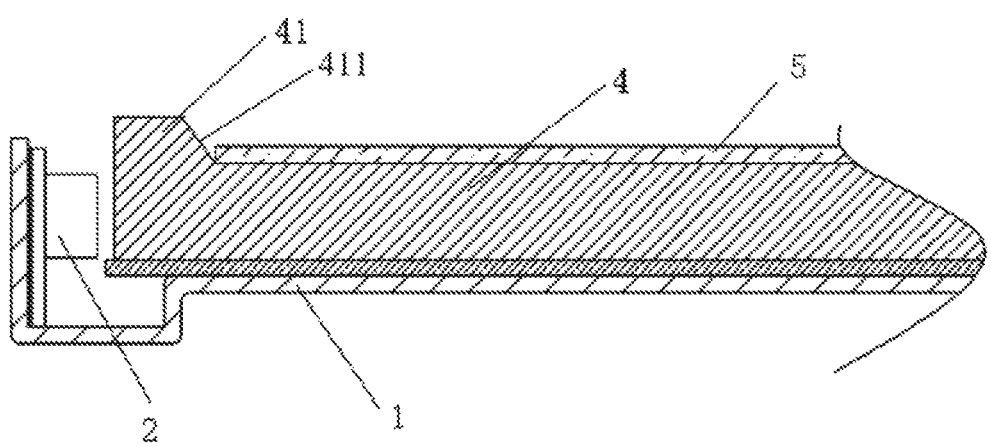
FIG. 2 is a schematic view showing a backlight module according to one embodiment of the present disclosure.

As illustrated in FIG. 2, the present disclosure provides in one embodiment a backlight module, which includes aback plate 1, a light guide plate (LGP) 4 arranged on the back plate 1 and including a central region and a peripheral region, and an optical sheet 5 arranged on a light-exiting surface of the LGP 4. The LGP 4 includes a supporting part 41 arranged at the peripheral region and configured to support a display panel.

It should be noted that, in this embodiment, the central region of the LGP is a region corresponding to a display region of the display panel, and the peripheral region of the LGP is a region surrounding the central region.

In such arrangement, the existing rubber frame is replaced by the supporting part 41 of the LGP 4 (or the supporting part 41 formed integrally with the LGP 4) so as to support the display panel. As a result, it is able to reduce the materials used as well as the production cost.

Alternatively, a positioning part 411 is arranged at a side of the supporting part 4 facing the central region and configured to position the optical sheet 5.

The positioning part 411 may be of various structures, as long as the optical sheet 5 can be delimited. Some possible structures of the positioning part 411 will be provided hereinafter.

Figure 5:
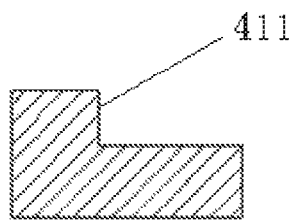
FIG. 5 is a schematic view showing a supporting part of the LGP according to one embodiment of the present disclosure.

As illustrated in FIG. 5, the positioning part 411 includes a planar surface perpendicular to the light-exiting surface of the LGP 4.

Figure 8:
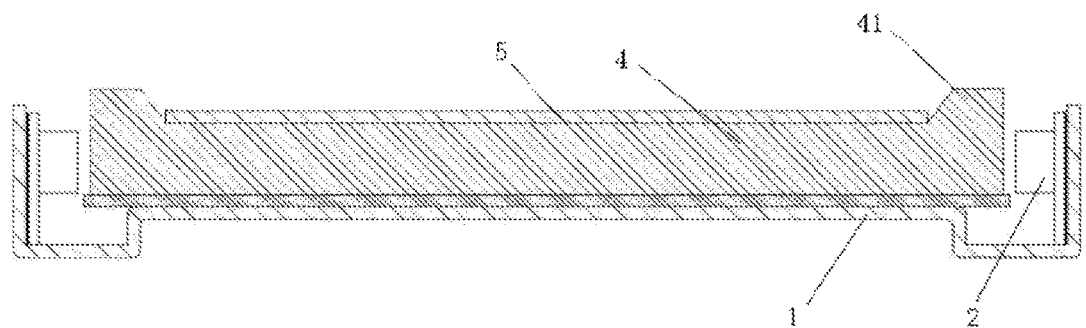
FIG. 8 is another schematic view showing a backlight module according to one embodiment of the present disclosure.
Figure 9:
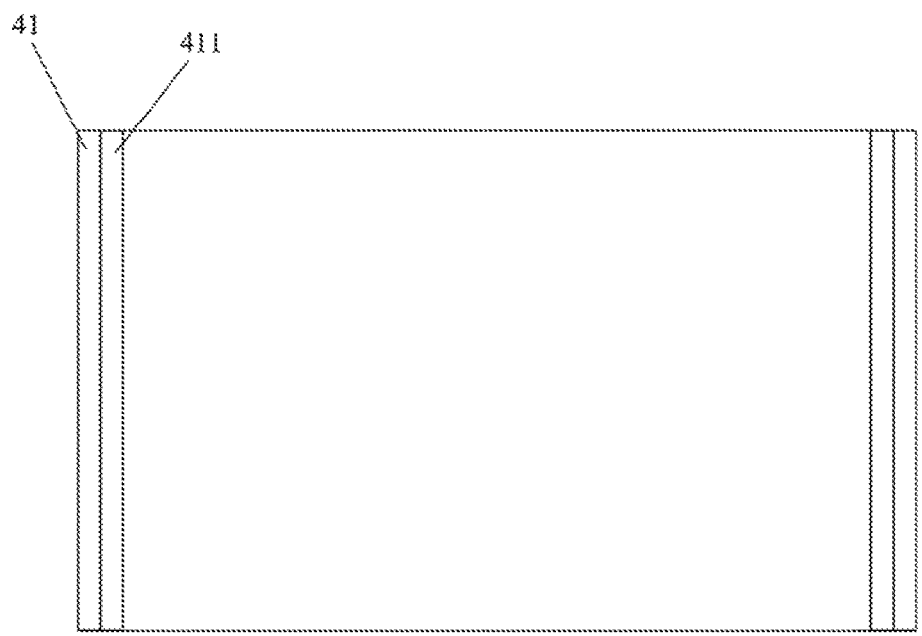
FIG. 9 is a top view of the supporting part shown in FIG. 8.
Figure 10:
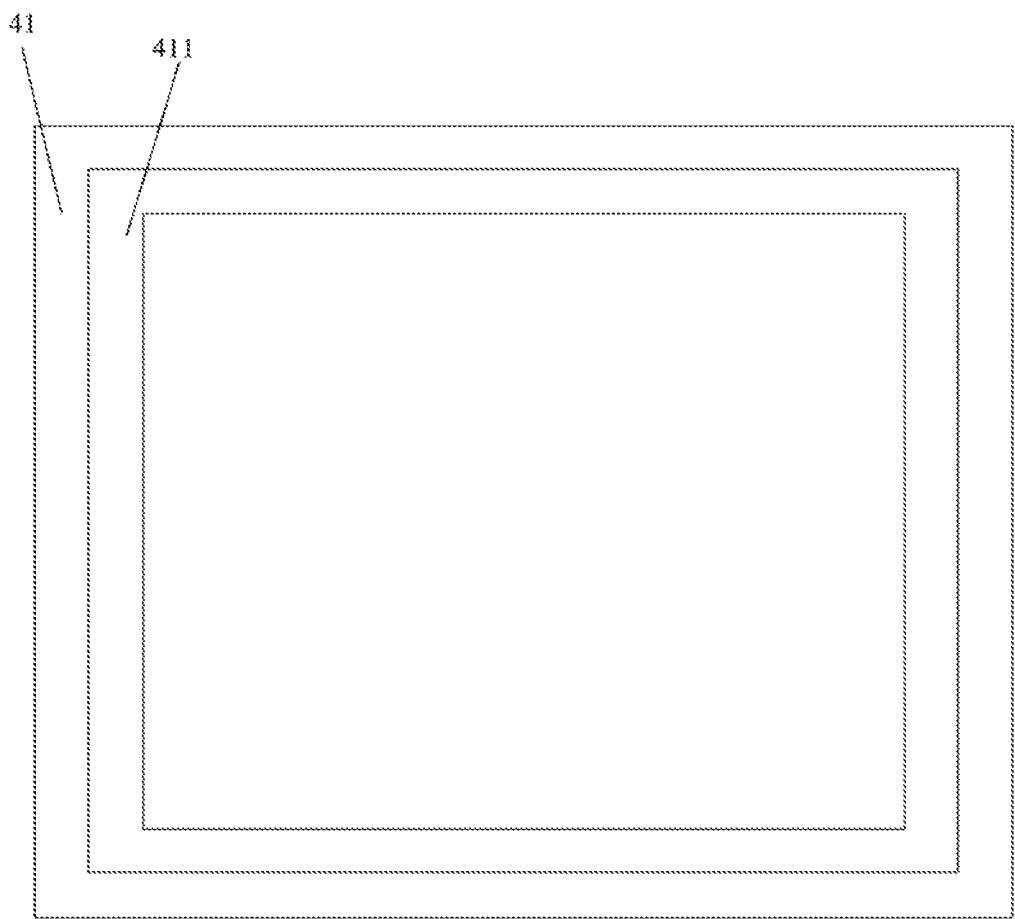
FIG. 10 is another top view of the supporting part according to one embodiment of the present disclosure.

As illustrated in FIGS. 8 and 9, the supporting part 41 is arranged at least at two opposite sides of the LGP 4 to support the display panel and delimit the optical sheet 5. Alternatively, as shown in FIG. 10, the supporting part 41 is arranged at the peripheral region of the LGP 4 and configured to support the display panel. The supporting part 41 surrounds the LGP 4 to form a frame, so as to prevent a middle portion of the display panel from being dented due to gravity.

With this structure, when a distance between the portions of the positioning part 411 arranged at the two opposite sides of the LGP 4 is too small, it is difficult to place the optical sheet 5, and when the distance between the portions of the positioning part 411 arranged at the two opposite sides of the LGP 4 is too large, the optical sheet 5 may shake and thus a display effect may be deteriorated. In this regard, when the structure in FIG. 5 is adopted, the distance between the portions of the positioning part 411 arranged at the two opposite sides of the LGP 4 is highly required.

Figure 6:
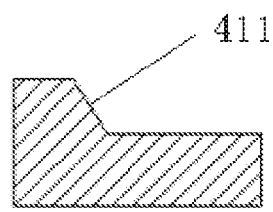
FIG. 6 is another schematic view showing the supporting part of the LGP according to one embodiment of the present disclosure.

As illustrated in FIG. 6, the positioning part 411 includes an inclined surface, and an angle between the inclined surface and the light-exiting surface of the LGP 4 is an obtuse angle.

With this structure, it is able to facilitate the mounting of the optical sheet 5 due to the inclined surface.

Figure 7:
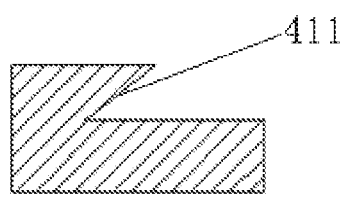
FIG. 7 is yet another schematic view showing the supporting part of the LGP according to one embodiment of the present disclosure.

As illustrated in FIG. 7, the positioning part 411 includes an inclined surface, and an angle between the inclined surface and the light-exiting surface of the LGP 4 is an acute angle.

With this structure, it is able to delimit the optical sheet 5 in both a horizontal direction and a vertical direction.

Figure 3:
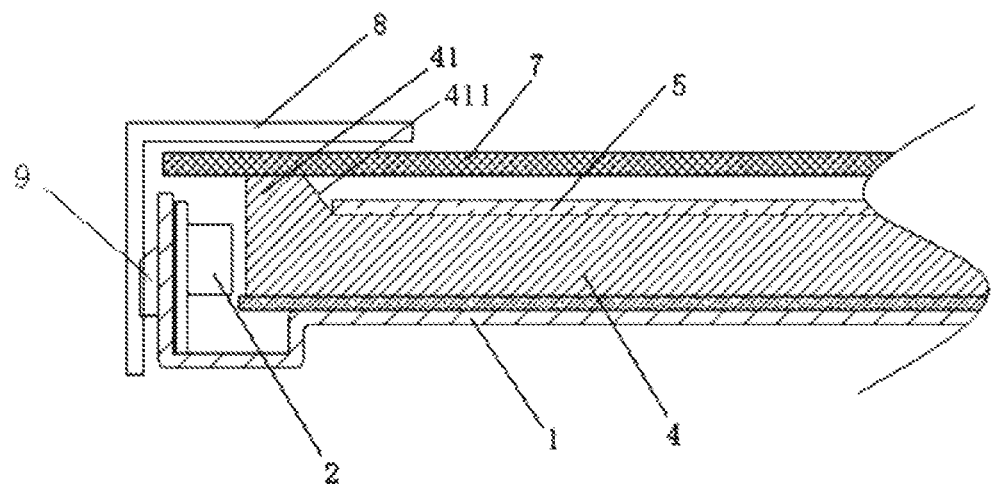
FIG. 3 is a schematic view showing a display device according to one embodiment of the present disclosure.
Figure 4:
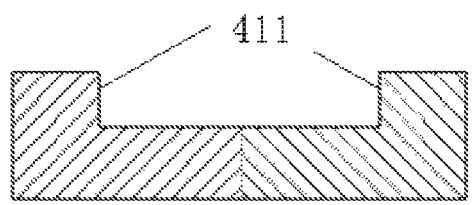
FIG. 4 is a schematic view showing an LGP according to one embodiment of the present disclosure.

As illustrated in FIG. 3, the present disclosure further provides in one embodiment a display device which includes the above-mentioned backlight module.

In this embodiment, the display device includes an edge-type backlight module, which includes components such as the back plate 1, the light source 2 arranged at a side of the back plate 1, a reflector 3 arranged on the back plate 1, the LGP 4, and the optical sheet 5. The LGP 4 is configured to guide light from the light source 2, and the optical sheet 5 is configured to make the light from the LGP 4 uniform and increase an intensity of the light in a direction perpendicular to the LGP 4. A supporting part is arranged at an edge of the LGP 4 for supporting the display panel.

In this embodiment, the display device further includes a bezel 8 configured to fix the backlight module to a display panel 7. The bezel 8 is fixedly connected to the back plate 1 of the backlight module through a fastening part.

The backlight module further includes a light source 2 arranged on a light-exiting surface of the LGP 4, the back plate 1 includes a fastening unit for fixing the light source 2, and the bezel 8 is fixedly connected to the fastening unit of the back plate 1 through a fastening part 9.

With this structure, the fastening unit of the back plate 1 for fixing the light source 2 is directly connected to the bezel 8 through the fastening part 9. As compared with the related art, it is unnecessary to provide a rubber frame, thereby to reduce a thickness of the display device.

Alternatively, the fastening part 9 is, but not limited to, a bolt.

The above are merely the preferred embodiments of the present disclosure. It should be noted that, a person skilled in the art may make further improvements and modifications without departing from the principle of the present disclosure, and these improvements and modifications shall also fall within the scope of the present disclosure.

What is claimed is:

1. A backlight module, comprising:
    a back plate;
    a light guide plate (LGP) arranged on the back plate and comprising a central region and a peripheral region; and
    an optical sheet arranged on a light-exiting surface of the LGP,
    wherein the LGP comprises a supporting part arranged on the peripheral region and configured to support a display panel,
    wherein the supporting part is arranged at least at two opposite sides of the LGP.

2. The backlight module according to claim 1, wherein a positioning part is arranged at a side of the supporting part facing the central region and configured to position the optical sheet.

3. The backlight module according to claim 2, wherein the positioning part comprises a planar surface perpendicular to the light-exiting surface of the LGP.

4. The backlight module according to claim 2, wherein the positioning part comprises an inclined surface, and an angle between the inclined surface and the light-exiting surface of the LGP is an acute angle.

5. The backlight module according to claim 1, wherein the supporting part surrounds the LGP to form a frame.

6. A display device comprising:
    a back plate;
    a light guide plate (LGP) arranged on the back plate and comprising a central region and a peripheral region;
    an optical sheet arranged on a light-exiting surface of the LGP; and
    a bezel configured to fix a backlight module to a liquid crystal display panel,
    wherein the bezel is fixedly connected to a back plate of the backlight module through a fastening part,
    wherein the LGP comprises a supporting part arranged on the peripheral region and configured to support a display panel.

7. The display device according to claim 6, wherein the backlight module further comprises a light source arranged on a light-exiting surface of a light guide plate (LGP), and the back plate comprises a fastening unit for fixing the light source; and
    the light source is fixedly connected to the fastening unit of the back plate through a fastening part.

8. The display device according to claim 6, wherein the fastening part is a bolt.

9. The backlight module according to claim 2, wherein the supporting part surrounds the LGP to form a frame.

10. The backlight module according to claim 3, wherein the supporting part surrounds the LGP to form a frame.

11. The backlight module according to claim 4, wherein the supporting part surrounds the LGP to form a frame.

12. The display device according to claim 6, wherein a positioning part is arranged at a side of the supporting part facing the central region and configured to position the optical sheet.

13. The display device according to claim 12, wherein the positioning part comprises a planar surface perpendicular to the light-exiting surface of the LGP.

14. The display device according to claim 12, wherein the positioning part comprises an inclined surface, and an angle between the inclined surface and the light-exiting surface of the LGP is an obtuse angle or an acute angle.

15. The display device according to claim 7, wherein the fastening part is a bolt.

16. A display device comprising:
- a back plate;
- a light guide plate (LGP) arranged on the back plate and comprising a central region and a peripheral region; and
- an optical sheet arranged on a light-exiting surface of the LGP,
- wherein the LGP comprises a supporting part arranged on the peripheral region and configured to support a display panel,
- wherein a positioning part is arranged at a side of the supporting part facing the central region and configured to position the optical sheet,
- wherein the positioning part comprises an inclined surface, and an angle between the inclined surface and the light-exiting surface of the LGP is an obtuse angle or an acute angle.

* * * * *